United States Patent
Cook

(10) Patent No.: US 11,844,037 B2
(45) Date of Patent: Dec. 12, 2023

(54) AUTOMATED DETERMINATION OF A TIMING OFFSET FOR DOCSIS TIME PROTOCOL TO PROVIDE PRECISION TIME PROTOCOL ACCURACY

(71) Applicant: Charter Communications Operating, LLC, St. Louis, MO (US)

(72) Inventor: Charles Cook, Castle Rock, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 17/384,400

(22) Filed: Jul. 23, 2021

(65) Prior Publication Data
US 2023/0021450 A1  Jan. 26, 2023

(51) Int. Cl.
*H04W 56/00* (2009.01)

(52) U.S. Cl.
CPC .............................. *H04W 56/0015* (2013.01)

(58) Field of Classification Search
CPC .. H04B 1/7073; H04B 1/7087; H04B 1/7156; H04B 1/7183; H04B 7/18589; H04B 7/19; H04B 7/2125; H04B 2201/7073; H04H 60/50; H04J 3/06; H04J 3/0602; H04J 3/0605; H04J 3/0614; H04J 3/0617
USPC ........................................................ 370/350
See application file for complete search history.

(56) References Cited

U.S. PATENT DOCUMENTS

| | | | | |
|---|---|---|---|---|
| 8,718,482 B1* | 5/2014 | Roberts | .................. | H04B 10/27 398/53 |
| 11,349,633 B1* | 5/2022 | Mirabito | ............... | H04L 7/0037 |
| 2012/0300859 A1* | 11/2012 | Chapman | .............. | H04J 3/0664 375/257 |
| 2015/0207579 A1* | 7/2015 | Chapman | .............. | H04J 3/0682 370/503 |
| 2016/0170439 A1* | 6/2016 | Aweya | .................... | H04L 69/28 713/401 |
| 2019/0045534 A1* | 2/2019 | Zaks | ................. | H04W 72/1284 |
| 2019/0334643 A1* | 10/2019 | Neugeboren | ....... | H04L 12/4625 |

(Continued)

OTHER PUBLICATIONS

Chapman, John T., et al., "The DOCSIS Timing Protocol (DTP) Generating Precision Timing Services from a DOCSIS System," https://www.nctatechnicalpapers.com/Paper/2011/SpringTechForum-000115, NCTA (National Cable & Telecommunications Association) Spring Technical Forum Proceedings, Spring 2011, 36 pages.

(Continued)

*Primary Examiner* — Robert J Lopata
(74) *Attorney, Agent, or Firm* — Dority & Manning, P.A.

(57) ABSTRACT

Automated determination of a timing offset for DOCSIS time protocol to provide precision time protocol accuracy. A cable modem receives, from a cable modem termination system (CMTS), a message that includes a timestamp that is correlated to a primary reference clock. The cable modem determines a downstream travel time representative of a period of time between a generation of the timestamp by the CMTS and a first timing reference point of the cable modem. The cable modem accesses an internal delay time representative of a period of time for the timestamp to travel from the first timing reference point to a second timing reference point of the cable modem, and sets a precision time protocol (PTP) clock of the cable modem to a time equal to the timestamp incremented by the downstream travel time and the internal delay time.

16 Claims, 6 Drawing Sheets

(56) References Cited

U.S. PATENT DOCUMENTS

| | | | |
|---|---|---|---|
| 2020/0015178 A1* | 1/2020 | Andreoli-Fang | H04J 3/0664 |
| 2020/0021378 A1* | 1/2020 | Aweya | H04J 3/0673 |
| 2020/0304224 A1* | 9/2020 | Neugeboren | H04L 43/106 |
| 2020/0328872 A1* | 10/2020 | Shi | H04J 3/0685 |
| 2020/0412469 A1* | 12/2020 | He | H04J 3/0661 |
| 2021/0303021 A1* | 9/2021 | Cui | G06F 1/12 |
| 2022/0060347 A1* | 2/2022 | Sevindik | H04W 28/06 |
| 2022/0209931 A1* | 6/2022 | Hewavithana | H04L 27/2695 |
| 2022/0248353 A1* | 8/2022 | Liu | H04W 56/001 |
| 2022/0263677 A1* | 8/2022 | Neugeboren | H04N 21/6118 |

OTHER PUBLICATIONS

Author Unknown, "Data-Over-Cable Service Interface Specifications Mobile Applications, Synchronization Techniques for DOCSIS® Technology Specification," CM-SP-SYNC-I02-210407, https://www.cablelabs.com/specifications/CM-SP-SYNC, Apr. 7, 2021, 118 pages.

* cited by examiner

US 11,844,037 B2

AUTOMATED DETERMINATION OF A TIMING OFFSET FOR DOCSIS TIME PROTOCOL TO PROVIDE PRECISION TIME PROTOCOL ACCURACY

BACKGROUND

A wireless base station may be located in proximity to one or more other wireless base stations such that concurrent transmissions of the wireless base stations may interfere with one another. To avoid interference, some wireless systems, such as time division multiple access (TDMA) wireless systems, grant time slots to wireless base stations during which the wireless base stations are permitted to transmit data. The wireless base stations need to be time synchronized within very close tolerances to ensure efficient use of the spectrum and to avoid overlapping transmissions which cause interference. Other wireless systems, such as code division multiple access (CDMA) wireless systems, utilize code words; however, time synchronization is similarly important in such systems to maximize performance of the wireless system.

SUMMARY

The embodiments disclosed herein provide automated determination of a timing offset for Data Over Cable Service Interface Specification (DOCSIS) Time Protocol (DTP) to provide precision time protocol (PTP) accuracy for wireless devices, such as base stations.

In one embodiment a method is provided. The method includes receiving, by a cable modem, from a cable modem termination system (CMTS), a message comprising a timestamp that is correlated to a primary reference clock. The method further includes determining, by the cable modem, a downstream travel time representative of a period of time between a generation of the timestamp by the CMTS and a first timing reference point of the cable modem. The method further includes accessing, by the cable modem, an internal delay time representative of a period of time for the timestamp to travel from the first timing reference point to a second timing reference point of the cable modem. The method further includes setting, by the cable modem, a precision time protocol (PTP) clock of the cable modem to a time equal to the timestamp incremented by the downstream travel time and the internal delay time.

In another embodiment a system is provided. The system includes a cable modem that includes a memory and a processor device coupled to the memory. The processor device is configured to receive, from a cable modem termination system (CMTS), a message comprising a timestamp that is correlated to a primary reference clock. The processor device is further configured to determine a downstream travel time representative of a period of time between a generation of the timestamp by the CMTS and a first timing reference point of the cable modem. The processor device is configured to access an internal delay time representative of a period of time for the timestamp to travel from the first timing reference point to a second timing reference point of the cable modem. The processor device is configured to set a precision time protocol (PTP) clock of the cable modem to a time equal to the timestamp incremented by the downstream travel time and the internal delay time.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
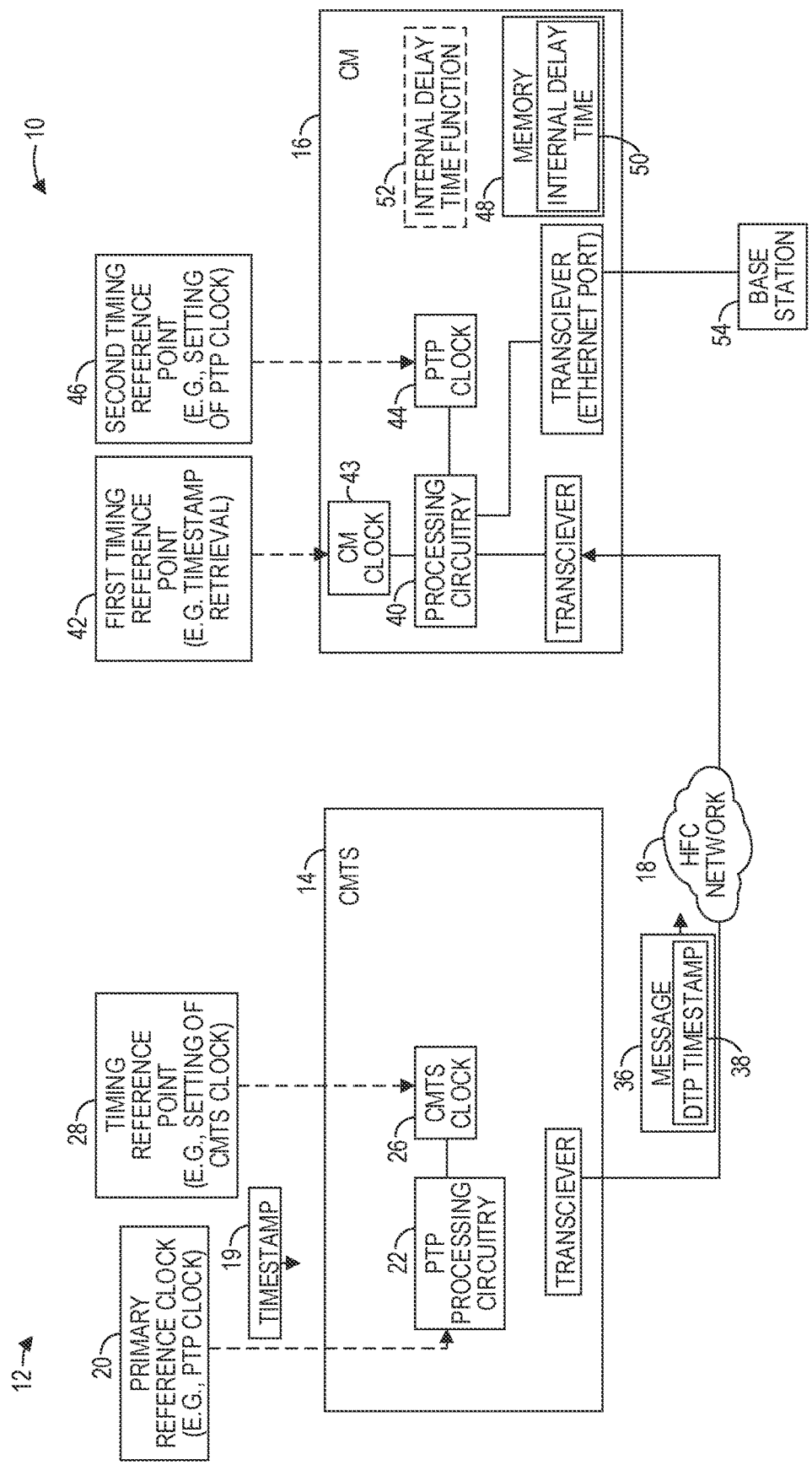
FIG. 1 is a block diagram of an environment suitable for implementing automated determination of a timing offset for Data Over Cable Service Interface Specification (DOCSIS) Time Protocol (DTP) to provide precision time protocol (PTP) accuracy for wireless devices according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A wireless base station may be located in proximity to one or more other wireless base stations such that concurrent transmissions of the wireless base stations may interfere with one another. To avoid interference, some wireless systems, such as time division multiple access (TDMA) wireless systems, grant time slots to wireless base stations during which the wireless base stations are permitted to transmit data. The wireless base stations need to be time synchronized within very close tolerances to ensure efficient use of the spectrum and to avoid overlapping transmissions which cause interference. Other wireless systems, such as code division multiple access (CDMA) wireless systems, utilize code words; however, time synchronization is similarly important in such systems to maximize performance of the wireless system.

In some locations it may be desirable to deploy a base station, such as a small cell or a femtocell, and utilize a Data Over Cable Service Interface Specification (DOCSIS) network for data backhaul. Often such base stations are installed in a location, such as an indoor location, that does not have line-of-sight to Global Navigation Satellite System (GNSS) satellites, and thus cannot time synchronize via the GNNS system. DOCSIS has its own time synchronization mechanism, DOCSIS Time Protocol (DTP); however, DTP was not designed to support the accurate timing requirements needed to support state-of-the-art wireless base stations.

The embodiments disclosed herein provide automated determination of a timing offset for DTP to provide precision time protocol (PTP) accuracy for wireless devices, such as base stations. The embodiments allow computing devices, such as a cable modem, that utilize DTP and that may be coupled to a base station to provide a highly accurate PTP timing signal to the base station. The base station utilizes the PTP timing signal to accurately transmit during allotted time slots so the base station does not interfere with other base stations that transmit in adjacent time slots.

FIG. 1 is a block diagram of an environment 10 illustrating a system 12 suitable for automated determination of a timing offset for DTP to provide PTP accuracy for wireless devices according to one embodiment. The system 12 includes a cable modem termination system (CMTS) 14 that is communicatively coupled to a cable modem 16 via a hybrid fiber coax (HFC) network 18. The CMTS 14 obtains a timing signal, such as a timestamp 19, from a primary reference clock 20. The primary reference clock 20 may comprise, for example, a PTP clock or a GNSS clock.

PTP processing circuitry 22 receives the timing signal and utilizing, for example, the PTP protocol, sets a CMTS clock 26 based on the timing signal at a timing reference point 28. The CMTS clock 26 may comprise, for example, a PTP clock. The CMTS 14 may synchronize the CMTS clock 26 with the primary reference clock 20 periodically, intermittently, or upon the occurrence of some event.

The CMTS 14 sends data to the cable modem 16 and receives data from the cable modem 16. Although not illustrated, the CMTS 14 also typically sends data to and receives data from tens, hundreds, or thousands of other cable modems. The CMTS 14 sends a message 36 to the cable modem 16 that includes a DOCSIS timestamp 38 that is generated based on the CMTS clock 26. The message 36 is communicated from the CMTS 14 through the HFC network 18 to the cable modem 16. Processing circuitry 40 extracts the DOCSIS timestamp 38 from the message 36 at a first timing reference point 42 and sets a CM clock 43 to the DOCSIS timestamp 38. The cable modem 16 determines a downstream travel time that represents the period of time between the generation of the DOCSIS timestamp 38 by the CMTS 14 and the first timing reference point 42. Mechanisms for determining the downstream travel time will be discussed below.

The processing circuitry 40 processes the DOCSIS timestamp 38 and sets a PTP clock 44 based on the DOCSIS timestamp 38 and, as explained in greater detail below, also based on downstream propagation delay (downstream travel time) and internal processing delay (e.g., internal delay), at a second timing reference point 46. There is an internal delay between the first timing reference point 42 and the second timing reference point 46 due to processing by the processing circuitry 40. If the PTP clock 44 is set without considering this internal delay and the downstream travel time, the PTP clock 44 will no longer be synchronized with the primary reference clock 20 and will be behind in time with respect to the primary reference clock 20 by the amount of the internal delay and the downstream travel time.

Determining the internal delay between the two timing reference points 42 and 46 in the cable modem 16 may be accomplished experimentally. However, experimentally determining the internal delay is time-consuming, and different models of cable modems may have different internal delays; different brands of cable modems may have different internal delays; and even different firmware versions of cable modems may have different internal delays. In a large network where many different models, brands, and firmware versions of cable modems may be utilized, determining the internal delay for each different cable modem may be impractical.

The embodiments implement a feature wherein the internal delay between the two timing reference points 42 and 46 is determined and provided by the manufacturer of the cable modem 16. In some implementations, the manufacturer may determine the internal delay and cause an internal delay time 50 to be stored in a non-volatile memory 48 of the cable modem 16 during the manufacturing process. The internal delay time 50 serves as a timing offset for synchronizing a clock. The processing circuitry 40 receives the DOCSIS timestamp 38, accesses the internal delay time 50, and sets the PTP clock 44 to a value equal to the DOCSIS timestamp 38 incremented by the downstream travel time and the internal delay time 50. In this manner, the PTP clock 44 is precisely synchronized with the primary reference clock 20.

In some embodiments, the cable modem 16 may have an internal delay time function 52 that, upon initialization/booting of the cable modem 16, measures the internal delay time between the two timing reference points 42 and 46 and stores the internal delay time as the internal delay time 50 in the memory 48. In other embodiments, the cable modem 16 may invoke the internal delay time function 52 each time the cable modem 16 synchronizes the PTP clock 44 with the primary reference clock 20. When invoked, the internal delay time function 52 determines the internal delay time and returns the internal delay time to the cable modem 16 for synchronizing the PTP clock 44 with the primary reference clock 20. The cable modem 16 may synchronize the PTP clock 44 with the primary reference clock 20 periodically, intermittently, or upon the occurrence of some event.

The PTP clock 44 may provide an accurate PTP timing signal for one or more base stations 54. The base stations 54 may use the PTP timing signal to transmit during allocated time slots, or utilize the PTP timing signal for other synchronization purposes. The base stations 54 may comprise any type of base station, such as, by way of non-limiting example, time division duplex (TDD) base stations, time division multiple access (TDMA) base stations, code division multiple access (CDMA) base stations, orthogonal frequency-division multiple access (OFDMA) base stations, or the like.

Figure 2:
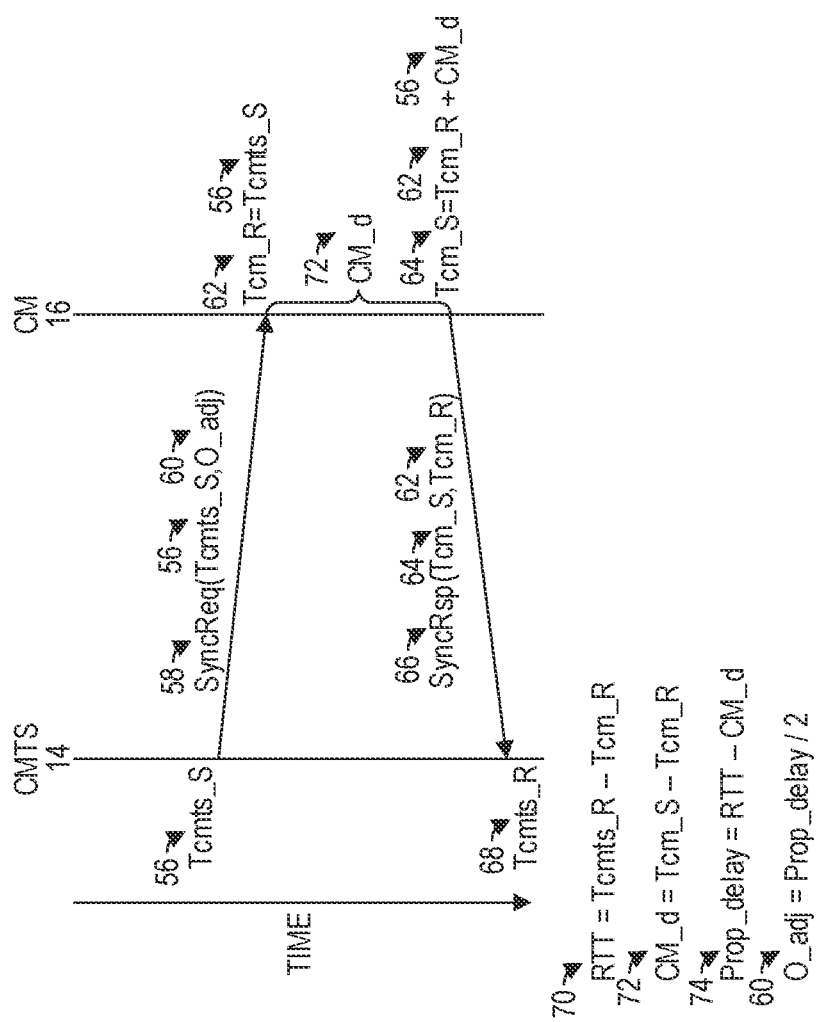
FIG. 2 is a sequence diagram illustrating a mechanism for determining a downstream travel time of data from a cable modem termination system (CMTS) to a cable modem according to one embodiment.

FIG. 2 is a sequence diagram illustrating a mechanism for determining a downstream travel time of a message transmitted from the CMTS 14 to the cable modem 16 according to one embodiment. In this embodiment, the CMTS 14 generates a DOCSIS timestamp 56 (Tcmts_S) based on the CMTS clock 26 and generates a SyncReq message 58 that includes the DOCSIS timestamp 56 (Tcmts_S). The SyncReq message 58 may also include a downstream travel time 60 (O_adj) which may initially be set to a value of zero. The cable modem 16 receives the SyncReq message 58 and sets a cable modem internal timestamp 62 (Tcm_R) equal to the value of the DOCSIS timestamp 56 (Tcmts_S). The cable modem 16 then generates a new timestamp 64 (Tcm_S), generates a SyncRsp message 66 that includes the timestamp 64 (Tcm_S) and the cable modem internal timestamp 62 (Tcm_R), and sends the SyncRsp message 66 to the CMTS 14.

The CMTS 14 receives the SyncRsp message 66. The CMTS 14 may utilize the cable modem internal timestamp 62 (Tcm_R) to correlate the SyncRsp message 66 with the correct corresponding SyncReq message 58. The CMTS 14 generates a new timestamp 68 (Tcmts_R). The CMTS 14 determines a round trip time 70 (RTT) by determining the difference between the new timestamp 68 (Tcmts_R) and the previously transmitted DOCSIS timestamp 56 (Tcmts_S). Thus, the round trip time 70 is the difference between the DOCSIS timestamp 56 (Tcmts_S) and the timestamp 68 (Tcmts_R).

The CMTS 14 then determines an internal delay 72 (CM_d) between the generation of the timestamp 62 (Tcm_R) and the timestamp 64 (Tcm_S) by determining the difference between the timestamp 62 (Tcm_R) and the timestamp 64 (Tcm_S). The CMTS 14 then determines a propagation delay 74 (Prop_delay) by subtracting the internal delay 72 (CM_d) from the round trip time 70 (RTT). The propagation delay 74 includes the downstream travel time of the SyncReq message 58 between the CMTS 14 and the cable modem 16 and the upstream travel time of the SyncRsp message 66 between the cable modem 16 and the CMTS 14. The CMTS 14 determines the downstream travel time 60 (O_adj) by dividing the propagation delay by two. The CMTS 14 sends the downstream travel time 60 (O_adj) to the cable modem 16 for subsequent use in setting the PTP clock 44 (FIG. 1). In other implementations, the CMTS 14 may send the timestamp 68 (Tcmts_R) to the cable modem 16, and the cable modem 16 may determine the downstream travel time 60 using the DOCSIS timestamp 56 (Tcmts_S), the timestamp 68 (Tcmts_R), the cable modem internal timestamp 62 (Tcm_R), and the timestamp 64 (Tcm_S).

In some embodiments, the CMTS 14 may maintain a list of cable modems to which the CMTS 14 is communicatively coupled and initiate this sequence with each cable modem at particular times, such as when a cable modem or the CMTS 14 initiates, and/or to recalculate the downstream delay time periodically. In other embodiments, the cable modem 16 may initiate the sequence, such as by sending a Sync_Start message to the CMTS 14. The cable modem 16 may initiate the sequence at particular times, such as when the cable modem 16 initiates, and/or to recalculate the downstream delay time periodically.

Figure 3:
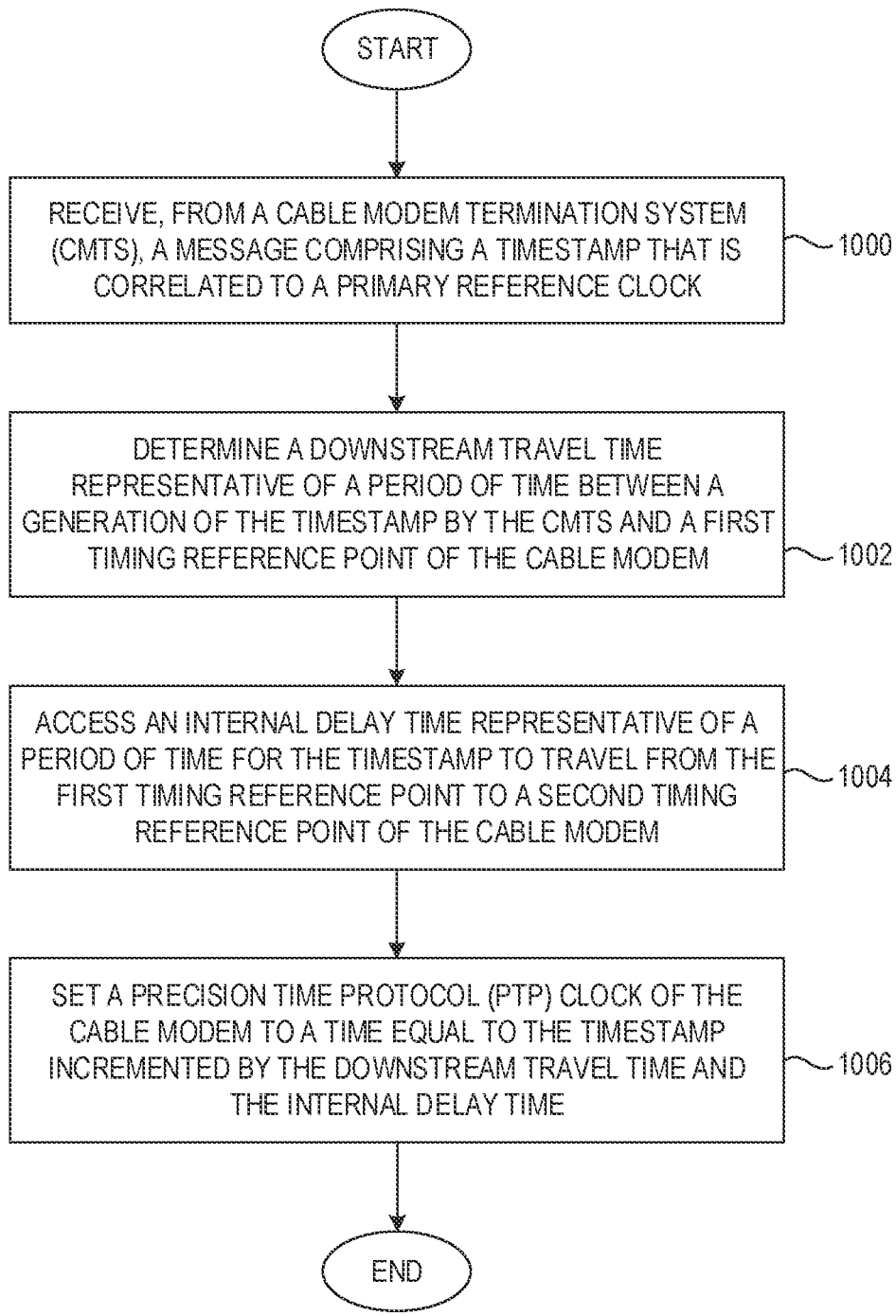
FIG. 3 is a flowchart of a method for automated determination of a timing offset for DTP to provide PTP accuracy according to one embodiment.

FIG. 3 is a flowchart of a method for automated determination of a timing offset for DTP to provide PTP accuracy according to one embodiment. FIG. 3 will be discussed in conjunction with FIGS. 1 and 2. The cable modem 16 receives, from the CMTS 14, the message 36 that includes the DOCSIS timestamp 38 that is correlated to a primary reference clock (e.g., the CMTS clock 26) (FIG. 3, block 1000). The cable modem 16 determines a downstream travel time (e.g., the downstream travel time 60) representative of a period of time between a generation of the DOCSIS timestamp 38 by the CMTS 14 and the first timing reference point 42 of the cable modem 16 (FIG. 3, block 1002). The cable modem 16 accesses the internal delay time 50 representative of a period of time for the timestamp to travel from the first timing reference point 42 to the second timing reference point 46 of the cable modem 16 (FIG. 3, block 1004). The cable modem 16 sets the PTP clock 44 of the cable modem 16 to a time equal to the DOCSIS timestamp 38 incremented by the downstream travel time and the internal delay time 50 (FIG. 3, block 1006).

Figure 4:
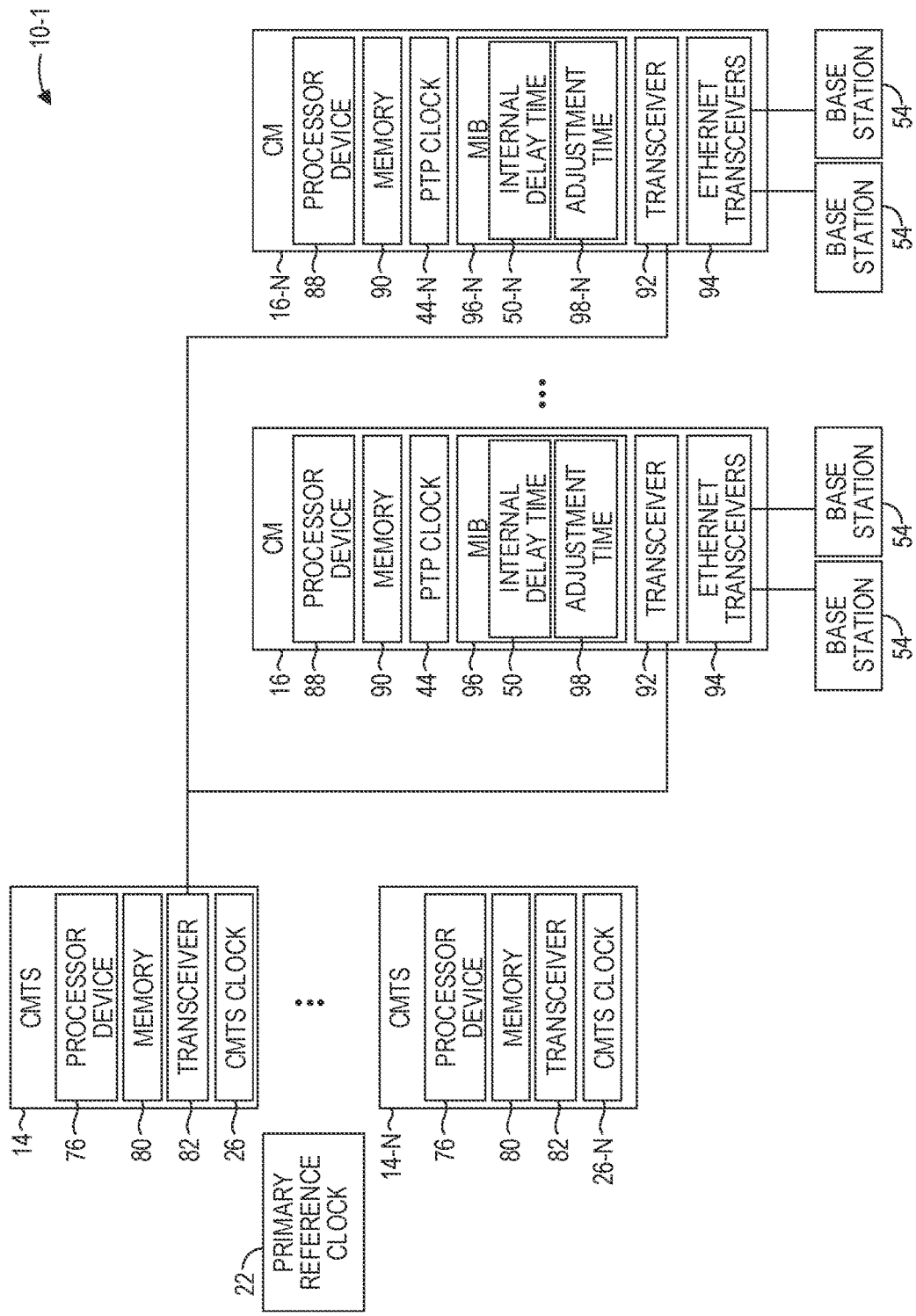
FIG. 4 is a block diagram of an environment suitable for implementing automated determination of a timing offset for DTP to provide PTP accuracy for wireless devices according to another embodiment.

FIG. 4 is a block diagram of an environment 10-1 suitable for implementing automated determination of a timing offset for DTP to provide PTP accuracy for wireless devices according to another embodiment. The environment 10-1 is substantially similar to the environment 10 illustrated in FIG. 1 except as otherwise noted herein. The environment 10-1 includes a plurality of CMTSs 14-14-N. The CMTSs 14-14-N each include a processor device 76 (which includes the processing circuitry 22, FIG. 1), a memory 80, and a transceiver 82 that is configured to communicate with one or more cable modems. The CMTS 14 includes the CMTS clock 26, which may be set as described with regard to FIG. 1. The CMTS 14-N includes a CMTS clock 26-N. The CMTS 14-N sets the CMTS clock 26-N clock in the same manner as discussed above with regard to the CMTS 14.

The CMTS 14 is coupled to a plurality of cable modems 16-16-N. The cable modems 16-16-N each include a processor device 88 (which includes the processing circuitry 40, FIG. 1), a memory 90, a transceiver 92 that is configured to communicate with the CMTS 14, and one or more transceivers 94, which is configured to communicate with one or more wireless base stations 54.

The cable modem 16 includes the PTP clock 44, the internal delay time 50, and the downstream travel time 60 (O_adj) determined in accordance with the process described above with reference to FIG. 2. In this embodiment, the internal delay time 50 is determined by the manufacturer of the cable modem 16 and is stored in an SNMP MIB 96. The cable modem 16 also includes an adjustment time 98 which may also be stored in the MIB 96. The adjustment time 98 is an additional time offset that may be used in setting the PTP clock 44 if the internal delay time 50 does not sufficiently accurately synchronize the PTP clock 44 with the primary reference clock 20. This may be determined experimentally or via any other suitable mechanism. For example, if it is determined that the internal delay time 50 causes the PTP clock 44 to be 0.00002 of a time unit behind the primary reference clock 20, the adjustment time 98 can be set to −0.00002. A command can be sent to the cable modem 16 to resynchronize the PTP clock 44. The process described with reference to FIG. 2 can be initiated between the CMTS 14 and the cable modem 16 to determine the downstream travel time 60 (O_adj). The processor device 88 receives the DOCSIS timestamp 38 from the CMTS 14 and sets the PTP clock 44 to a value equal to the DOCSIS timestamp 38 incremented by the downstream travel time 60, the internal delay time 50, and the adjustment time 98.

In one embodiment, the cable modem 16 may receive and install a firmware upgrade. The firmware upgrade includes a newly determined internal delay time that corresponds to the firmware upgrade. As part of the firmware upgrade, the cable modem 16 stores the newly determined internal delay time in the MIB 96 in place of the previously determined internal delay time 50.

The cable modem 16 may receive a plurality of packets from a wireless base station 54 that are destined for other computing devices. The cable modem 16 may then request, from the CMTS 14, a time slot for transmitting the plurality of packets to the CMTS 14. The cable modem 16 receives, from the CMTS 14, a time slot identifier that identifies the time slot, and subsequently transmits, to the CMTS 14, the plurality of packets at a time such that the plurality of packets arrives at the CMTS 14 within the time slot.

The cable modem 16-N includes a PTP clock 44-N, a MIB 96-N, an internal delay time 50-N, and an adjustment time 98-N. The cable modem 16-N sets the PTP clock 44-N in the same manner as discussed above with regard to the cable modem 16. However, the cable modem 16-N may be a different model than the cable modem 16, may be the same model as the cable modem 16 but on a different firmware level, or may be manufactured by a different manufacturer. Thus, the internal delay time 50-N may be different from the internal delay time 50, and the adjustment time 98-N may be different from the adjustment time 98.

Figure 5:
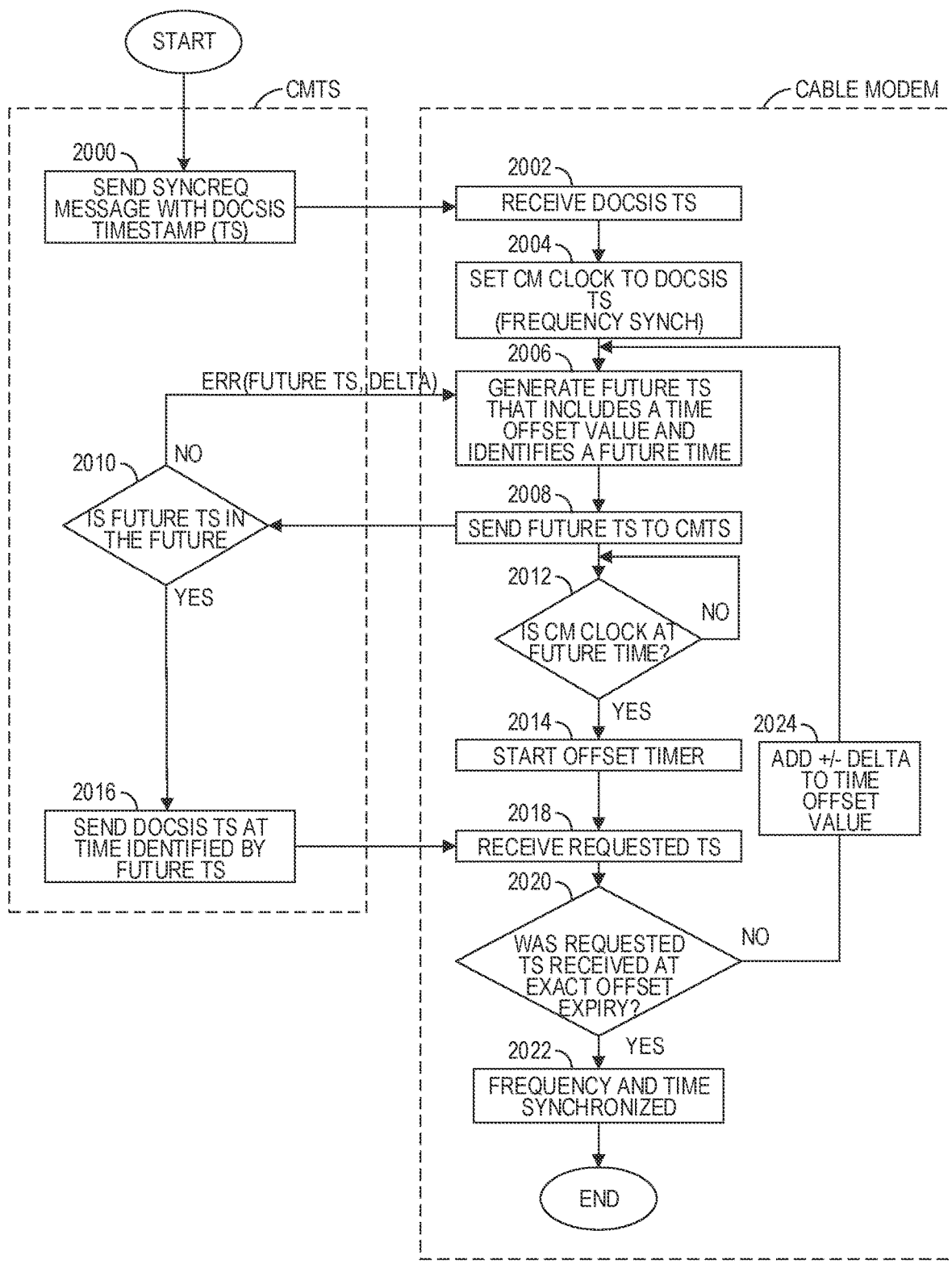
FIG. 5 is a flowchart of a method for automated determination of a timing offset for DTP to provide PTP accuracy according to another embodiment wherein the downstream travel time and upstream travel time may be asymmetric.

FIG. 5 is a flowchart of a method for automated determination of a timing offset for DTP to provide PTP accuracy according to another embodiment wherein the downstream travel time and upstream travel time may be asymmetric. FIG. 5 will be discussed with reference to elements illustrated in FIG. 1. The process in FIG. 5 may be performed subsequent to the process described in FIG. 2 to determine whether the downstream travel time and upstream travel time are symmetric or asymmetric. Thus, a downstream travel time may have already been determined in accordance with the process described in FIG. 2, but such downstream travel time may be inaccurate if the downstream travel time and the upstream travel time are asymmetric. The determined downstream travel time may be used as a starting point for the process described herein with regard to FIG. 5. Alternatively, the process described in FIG. 5 may be used in lieu of the process described in FIG. 2. The CMTS 14 generates a DOCSIS timestamp and sends a SyncReq message to the cable modem 16 (FIG. 5, block 2000). The cable modem 16 receives the DOCSIS timestamp and sets the CM clock 43 (FIG. 1) to the DOCSIS timestamp (FIG. 5, blocks 2002-2004). At this point, the cable modem 16 is frequency synchronized with the CMTS 14 but may not be time synchronized because whether the downstream travel time is symmetric or asymmetric is not yet known. The cable modem 16 generates a future timestamp (TS) request that includes a future TS (i.e., a time at which the cable modem 16 requests the CMTS 14 to send a new timestamp) that includes a time offset value and that identifies a future time for the CMTS 14 to send a new timestamp (FIG. 5, block 2006). The future time may be based on a particular time offset value and a determined round trip time of a message between the CMTS 14 and the cable modem 16, as discussed above with regard to FIG. 2, or may be based on an estimated round trip time.

The cable modem 16 sends the future TS request to the CMTS 14 (FIG. 5, block 2008). The CMTS 14 receives the future TS request and determines if the future TS identified in the future TS request is indeed in the future (FIG. 5, block 2010). If not, the CMTS 14 sends an error message to the cable modem 16 that includes the future TS (which was received by the CMTS 14 at a point in time that was later than when the cable modem 16 projected that the CMTS 14 would receive it), and a delta value that identifies a difference between the time of the reception of the future TS request from the cable modem 16 according to the current time according to the CMTS clock 26. The cable modem 16 receives this error message at block 2006 and thus increases the estimate of how far in the future to request the CMTS 14 to transmit a future TS by at least the delta value.

If at block 2010 the future TS is in the future, the CMTS 14 awaits until the future time arrives. Concurrently, the cable modem 16 iteratively checks to see if the CM clock 43 is at the future time (FIG. 5, block 2012). When the CM clock 43 is at the future time, the cable modem 16 starts an offset timer set to the value of the time offset value (FIG. 5, block 2014). At the future time, the CMTS 14 sends a DOCSIS timestamp that reflects the time of the CMTS clock 26 to the cable modem 16 (FIG. 5, block 2016). The cable modem 16 receives the DOCSIS timestamp from the CMTS 14 (FIG. 5, block 2018). If the DOCSIS timestamp was received at the exact time of the expiration of the offset timer, then the CMTS clock 26 and the CM clock 43 are both frequency and time synchronized (FIG. 5, block 2022).

If the DOCSIS timestamp was not received at the exact time of the expiration of the offset timer, then the CMTS clock 26 and the CM clock 43 are not time synchronized, and the time offset value is incremented or decremented, as appropriate, and the process is iteratively repeated until the DOCSIS timestamp is received at the exact time of the expiration of the offset timer (FIG. 5, block 2024). The value of the offset timer now correctly identifies the downstream travel time and may be added to the internal delay time 50 and a DTP timestamp received from the CMTS 14 to synchronize the PTP clock 44 (FIG. 1).

Figure 6:
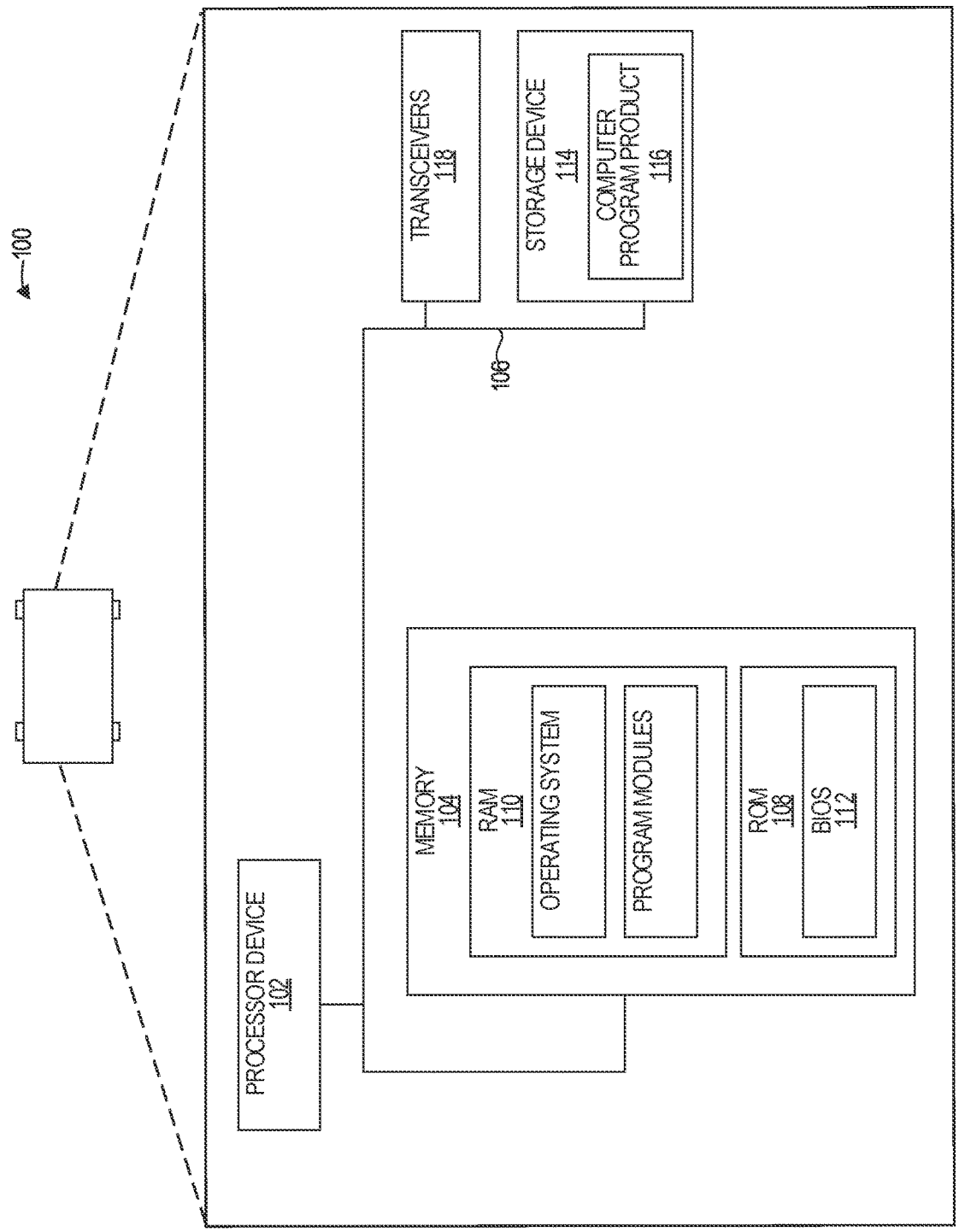
FIG. 6 is block diagram of a computing device suitable for implementing embodiments disclosed herein.

FIG. 6 is a block diagram of a computing device 100 suitable for implementing the CMTS 14 or the cable modem 16. The computing device 100 may comprise any computing or electronic device capable of including firmware, hardware, and/or executing software instructions to implement the functionality described herein with respect to the CMTS 14 and/or the cable modem 16. The computing device 100 includes a processor device 102, a memory 104, and a system bus 106. The system bus 106 provides an interface for system components including, but not limited to, the memory 104 and the processor device 102. The processor device 102 can be any commercially available or proprietary processor.

The memory 104 may include non-volatile memory 108 (e.g., read-only memory (ROM), erasable programmable read-only memory (EPROM), electrically erasable programmable read-only memory (EEPROM), etc.), or may be used to store the internal delay time 50 and the adjustment time 98 when implementing the cable modem 16. The memory 104 may also include a volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as the storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system and one or more program modules which may implement the functionality described herein in whole or in part.

All or a portion of the examples may be implemented as a computer program product 116 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102.

The computing device 100 may also include one or more transceivers 118 suitable for communicating with various other computing devices and/or base stations 54. The transceivers 118 may include one or more coaxial transceivers, Ethernet transceivers, fiber optic transceivers, or the like.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    receiving, by a cable modem, from a cable modem termination system (CMTS), a message comprising a timestamp that is correlated to a primary reference clock;
    determining, by the cable modem, a downstream travel time representative of a period of time between a generation of the timestamp by the CMTS and a first timing reference point of the cable modem, wherein determining the downstream travel time comprises:
        sending, to the CMTS, a request to send a timing message at a future time according to a clock of the CMTS;
        responsive to sending the request, receiving, from the CMTS, the timing message; and
        comparing the future time according to the clock of the CMTS to a time of receipt of the timing message by the cable modem;
    accessing, by the cable modem, an internal delay time representative of a period of time for the timestamp to travel from the first timing reference point to a second timing reference point of the cable modem; and
    setting, by the cable modem, a precision time protocol (PTP) clock of the cable modem to a time equal to the timestamp incremented by the downstream travel time and the internal delay time.

2. The method of claim 1 wherein the first timing reference point is a point in time wherein the cable modem extracts the timestamp from the message.

3. The method of claim 1 wherein the timestamp is a data over cable service interface specification (DOCSIS) timestamp.

4. The method of claim 1 wherein the primary reference clock comprises one of a master precision timing protocol clock and a global navigation satellite systems (GNSS) clock.

5. The method of claim 1 wherein accessing the internal delay time comprises accessing, by the cable modem from a memory of the cable modem, the internal delay time.

6. The method of claim 5 wherein the memory comprises a non-volatile memory.

7. The method of claim 1 wherein accessing the internal delay time comprises invoking, by the cable modem, an internal delay time function of the cable modem, and receiving, from the internal delay time function, the internal delay time.

8. The method of claim 1 further comprising:
    sending, by the cable modem to a wireless base station communicatively coupled to the cable modem, a time signal based on the PTP clock.

9. The method of claim 8 further comprising:
    receiving, by the cable modem from the wireless base station, a plurality of packets;
    requesting, by the cable modem from the CMTS, a time slot for transmitting the plurality of packets;
    receiving, by the cable modem from the CMTS, a time slot identifier that identifies the time slot; and
    transmitting, by the cable modem to the CMTS, the plurality of packets at a time such that the plurality of packets arrives at the CMTS within the time slot.

10. The method of claim 1 wherein the internal delay time is maintained in a memory of the cable modem, and further comprising:
    receiving, by the cable modem, a firmware upgrade; and
    storing, by the cable modem in the memory, a new internal delay time that corresponds to the firmware upgrade in lieu of the internal delay time.

11. The method of claim 1 further comprising:
    subsequent to setting the PTP clock to the time equal to the timestamp incremented by the downstream travel time and the internal delay time, receiving, by the cable modem, an adjustment time; and
    setting the PTP clock to a time equal to a current time of the PTP clock incremented or decremented by the adjustment time.

12. A system comprising:
    a cable modem comprising:
        a memory; and
        a processor device coupled to the memory and configured to:
            receive, from a cable modem termination system (CMTS), a message comprising a timestamp that is correlated to a primary reference clock;
            determine a downstream travel time representative of a period of time between a generation of the timestamp by the CMTS and a first timing reference point of the cable modem, wherein determining the downstream travel time comprises:
                sending, to the CMTS, a request to send a timing message at a future time according to a clock of the CMTS;
                responsive to sending the request, receiving, from the CMTS, the timing message; and
                comparing the future time according to the clock of the CMTS to a time of receipt of the timing message by the cable modem;
            access an internal delay time representative of a period of time for the timestamp to travel from the first timing reference point to a second timing reference point of the cable modem; and set a precision time protocol (PTP) clock of the cable modem to a time equal to the timestamp incremented by the downstream travel time and the internal delay time.

13. The system of claim 12 wherein the internal delay time is maintained in the memory, and wherein the processor device is further configured to:
   receive a firmware upgrade; and
   store, in the memory, a new internal delay time that corresponds to the firmware upgrade in lieu of the internal delay time.

14. The system of claim 12 wherein the processor device is further configured to:
   subsequent to setting the PTP clock to the time equal to the timestamp incremented by the downstream travel time and the internal delay time, receive an adjustment time; and
   set the PTP clock to a time equal to a current time of the PTP clock incremented or decremented by the adjustment time.

15. The system of claim 12 further comprising:
   the cable modem termination system (CMTS) comprising:
      a CMTS memory; and
      a CMTS processor device coupled to the CMTS memory;
   and wherein the processor device is further configured to:
      send, to a wireless base station communicatively coupled to the cable modem, a time signal based on the PTP clock;
      receive, from the wireless base station, a plurality of packets;
      request, from the CMTS, a time slot for transmitting the plurality of packets;
      receive, from the CMTS, a time slot identifier that identifies the time slot; and
      transmit, to the CMTS, the plurality of packets at a time such that the plurality of packets arrives at the CMTS within the time slot.

16. The system of claim 12 wherein to access the internal delay time, the processor device is further configured to access, from a memory of the cable modem, the internal delay time.

* * * * *